UNITED STATES PATENT OFFICE.

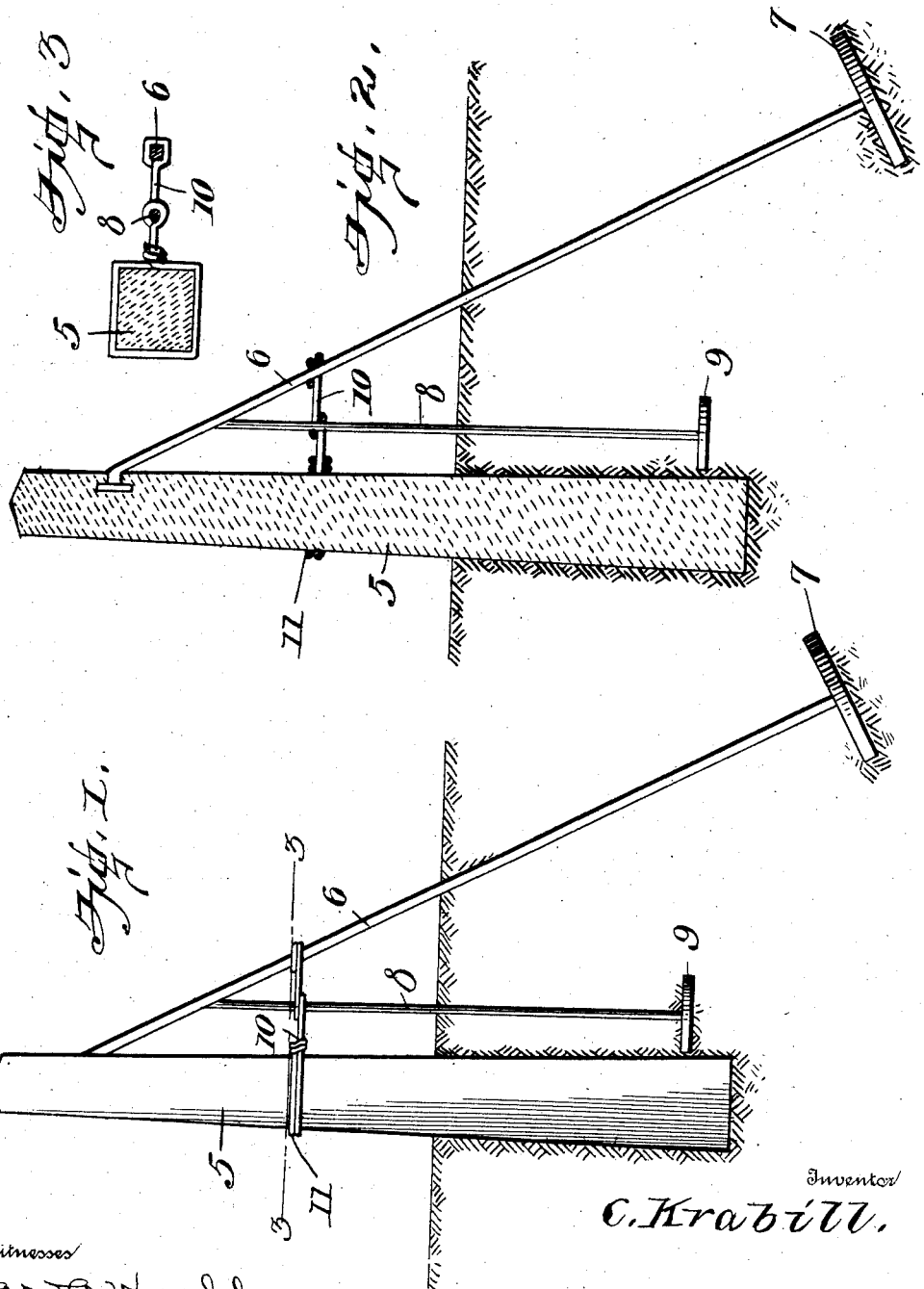

CHRISTIAN KRABILL, OF EDGERTON, OHIO.

POST-BRACE.

No. 883,205.    Specification of Letters Patent.    Patented March 31, 1908.

Application filed November 19, 1907. Serial No. 402,869.

*To all whom it may concern:*

Be it known that I, CHRISTIAN KRABILL, a citizen of the United States, residing at Edgerton, in the county of Williams and State of Ohio, have invented certain new and useful Improvements in Post-Braces, of which the following is a specification.

This invention relates to fence posts, and more particularly to a brace therefor, and has for its object to provide a brace whereby the post may be permanently held with a portion within the ground and against movement in either direction.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevational view of the present brace, Fig. 2 is a vertical longitudinal sectional view, Fig. 3 is a cross sectional view on the line 3—3 of Fig. 1.

Referring now more particularly to the drawings, there is shown a fence post 5, to which there is attached one end of a downwardly inclined brace bar 6. The bar 6 is arranged with a portion within the ground as shown and upon the end of this portion, there is shown a head 7 which is thus arranged to extend at an obtuse angle from the ground line as shown. Connected to the brace bar 6 and preferably at the upper end thereof there is shown a wire or metallic rod 8, and this rod is thus arranged with a portion within the ground, and upon this portion there is shown a head 9. The head 9 is arranged to extend in a parallel plane with the ground line. A wire 10 is wrapped around the brace bar 6, and this wire is also wrapped around the wire 8, and from the wire 8 the wire 10 is extended and finally wrapped around the post as shown at 11.

By provision of the brace bar 6 and the head 7 which is carried thereby it will be seen that the brace bar is held against upward movement, and by the provision of the wire 8 which is connected to the brace rod and which carries the head 9 at its lower end the post 5 will be held against withdrawal. By means of the wire 10 it will be seen that the post 5 is prevented from turning. A brace as constructed is simple in its structure, and its structure is such that the post 5 is securely held within the ground.

What is claimed is:

The combination with a fence post, of a brace therefor, the brace including a downwardly inclined brace bar, the brace bar having a head at its lower end, a vertical wire connected to the brace rod, the wire having a horizontally extending head at its lower end, and a connecting wire secured at one end to the brace rod, the rod being secured to the vertical wire, the wire also being secured to the post.

In testimony whereof I affix my signature, in presence of two witnesses.

CHRISTIAN KRABILL.

Witnesses:
W. J. WALKER,
JULIA O. NORWAY.